(No Model.)
W. I. DREISBACH.
PNEUMATIC TIRE.
No. 588,557. Patented Aug. 24, 1897.
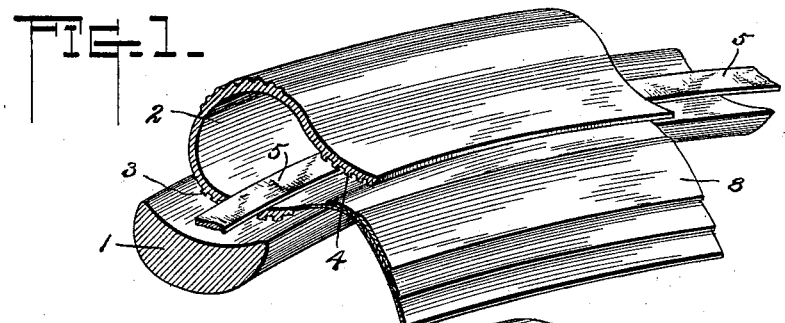
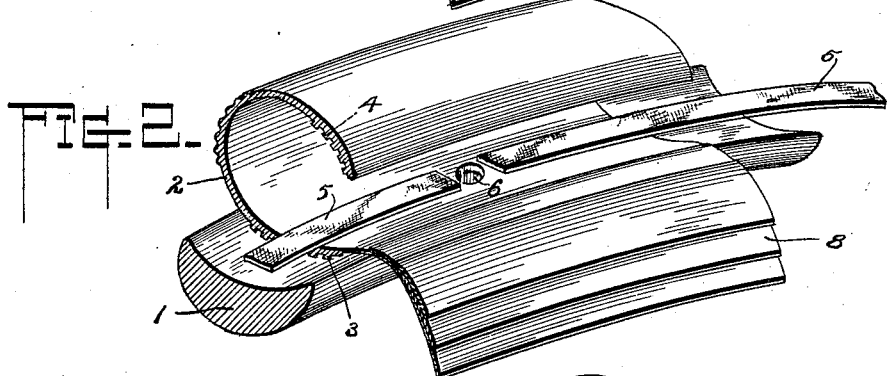
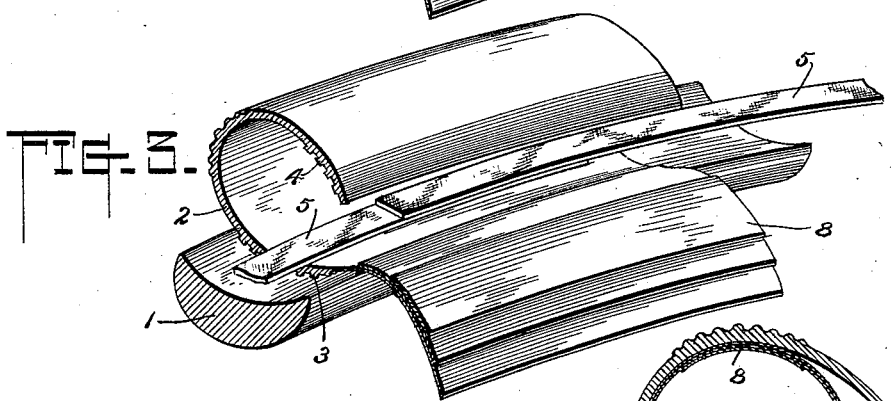
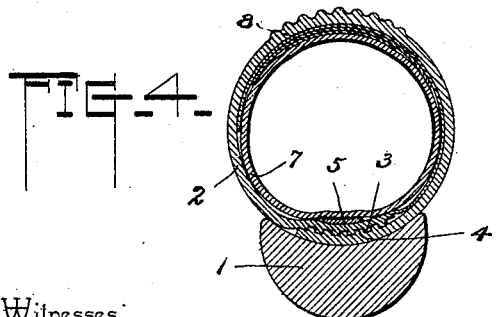
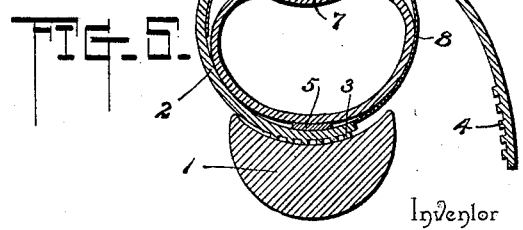
Witnesses
A. M. Poynton.
R. M. Smith.
Inventor
William I. Dreisbach,
By his Attorneys,
C. A. Snow & Co.

UNITED STATES PATENT OFFICE.

WILLIAM I. DREISBACH, OF WILLIAMSPORT, PENNSYLVANIA, ASSIGNOR TO JABIN B. BALDWIN, DELAS S. MAHAFFEY, AND SARAH K. DREISBACH, OF SAME PLACE.

PNEUMATIC TIRE.

SPECIFICATION forming part of Letters Patent No. 588,557, dated August 24, 1897.

Application filed July 11, 1896. Serial No. 598,862. (No model.)

*To all whom it may concern:*

Be it known that I, WILLIAM I. DREISBACH, a citizen of the United States, residing at Williamsport, in the county of Lycoming and State of Pennsylvania, have invented a new and useful Pneumatic Tire, of which the following is a specification.

This invention relates to pneumatic tires, and refers particularly to that class of tires employing an outer case and an inner tube, the latter being inflatable and the former detachable for giving access to the inner tube in case of puncture.

This invention has for its object to provide an outer case the opposite edges of which are formed to interlock with each other in the rim of the wheel and arranged in such manner that the pressure exerted by the compressed air within the tire will effect a firm bond or engagement between such tire edges.

A further object is to provide in connection with such outer case a band of adhesive tape or "piping" for holding the outer case in the rim and allowing the free edge thereof to be removably inserted between the opposite edge and the wheel-rim when the tire is deflated, the said band extending circumferentially around the rim and having its ends lapped and secured.

The invention also has for its object to provide the outer case at one edge with a nonpuncturable flap extending circumferentially around the tire and occupying a position immediately under the tread portion of the outer case and outside of the inner tube. Thus the tire is held in the rim by its own inflation and does not depend upon any clenching engagement with the rim or cementation for holding the same in place.

With these and other objects in view the invention consists in a pneumatic tire embodying certain novel features and details of construction, as hereinafter fully described, illustrated in the drawings, and finally incorporated in the claims.

In the accompanying drawings, Figure 1 is a perspective view of a section of a pneumatic tire constructed in accordance with the present invention, the same being shown applied to a fragmentary portion of the rim and partially detached in readiness to receive the inner tube. Fig. 2 is a similar view taken adjacent to the valve and showing the manner of applying the initial ends of the adhesive tape or piping. Fig. 3 is a similar view taken at the opposite side of the rim, showing the manner of lapping the opposite ends of the adhesive tape or securing-band. Fig. 4 is a cross-section through the tire and rim, the inner tube being inflated. Fig. 5 is a similar view showing the tire deflated and the free edge of the outer case removed to give access to the inner tube.

Similar numerals of reference designate corresponding parts in the several figures of the drawings.

Referring to the drawings, 1 designates a wheel-rim, which may be either of wood or metal, being shown for the purpose of illustration in the form of the ordinary wood rim commonly employed in bicycle-wheels and having the concaved periphery forming the tire-seat.

As the improved tire contemplated in this invention has no direct or positive interlocking connection or engagement with the wheelrim, the concaved rim-seat is left perfectly smooth.

The outer case 2 of the improved tire may either be smooth or corrugated as to its outer surface, and if corrugated the ribs may be of any desired size and may be located simply at the tread portion or as well at the sides of the tire. In order to carry out the present invention, the outer case is provided at one of its longitudinal edges and upon its outer side with several parallel longitudinal ribs or beads 3, and the opposite or what may be termed the "free" edge of the outer case is provided with corresponding ribs or beads 4 upon the inner surface of the case, the said ribs 4 being intended to interlock with the other ribs 3.

The inner or what may be termed the "stationary" edge of the outer case is primarily fastened in the rim by means of a band 5 of adhesive tape or what is commonly called "piping." After placing the said edge of the outer case in the wheel-rim two pieces of adhesive tape are employed and started with their adjacent ends applied to the outer case at each side of the opening 6 therein for the passage of the valve of the inner tube. The two pieces or sections of the band 5 are now wrapped entirely around the rim, and upon reaching the opposite side from the valve the ends of the band-sections are lapped over each other, when they will adhere to each other and to the inner surface of the outer case, thus holding the inner or stationary edge of the outer case upon the rim. The free edge of the outer case is now turned over the rim and the inner inflatable tube 7 is then placed upon the rim and tucked between the stationary and free edges of the outer case, after which the free edge of said case containing the ribs or beads 4 is tucked or inserted under the stationary edge, the band 5 yielding sufficiently to permit the proper insertion thereof and the bringing of the ribs 4 into interlocking engagement with the ribs 3. Upon inflating the inner tube the latter will press firmly against the band 5 and will also press the stationary edge of the outer case firmly against the free edge, confining the latter between said stationary edge and the wheel-rim with a pressure proportionate to the degree of inflation of the inner tube.

The stationary edge of the outer case is provided with a flap 8 of suitable fabric or textile material, such as canvas or South Sea Island cotton or a combination of both. This flap is made sufficiently wide to extend between the inner tube and the outer case at the tread portion of the tire and is preferably made in laminated form or composed of a plurality of layers or thicknesses of different relative widths, the flap as a whole being thickest at its central portion just at the tread of the tire and tapering equally in opposite directions therefrom, so as to give a smooth interior surface to the outer case. The flap 8 prevents the puncturing of the inner tube and also facilitates the tucking of the free edge of the outer case under the stationary edge thereof, also avoiding the liability of pinching the inner tube between the lapped edges of the outer case.

From the foregoing description it will be seen that the tire is held in the rim without any direct interlocking engagement therewith, the use of cement being also entirely dispensed with, so that the outer case may be readily detached for giving access to the inner tube. The flap at the stationary edge of the tire reduces the liability of puncturing, and the band 5 forms a protector for preventing the ends of the spokes from punching through the inner portion of the tire. It will also be seen that the more tightly the tire is inflated the firmer will be the bond or interlocking engagement between the edges of the outer tube.

Having thus described the invention, what is claimed as new is—

1. In a pneumatic tire, an outer case provided at one of its edges with a series of parallel longitudinal ribs arranged on the outer surface thereof, and a series of parallel longitudinal ribs at the opposite edge of said case arranged upon the inner surface thereof, the ribs upon the opposite edges being adapted to interlock, combined with a tape extending circumferentially around one of said edges for binding the same upon the rim, the said tape being capable of yielding sufficiently to permit the free edge of the outer case to be removably inserted between the bound edge and the rim and to be interlocked with said bound edge under the tape, substantially as described.

2. In a pneumatic tire, the combination with a wheel-rim and inner inflatable tube, of an outer case surrounding the inner tube and provided as to its opposite edges with a series of parallel longitudinal interlocking ribs or corrugations, and an adhesive band or tape extending circumferentially around the rim and serving to bind one of the edges of the outer case on the rim, the ends of said band or tape being overlapped upon each other, the said band being capable of yielding sufficiently to permit the free edge of the outer case to be removably inserted between the bound edge and the rim and to be interlocked with said bound edge under the tape, substantially as described.

3. In a pneumatic tire, the combination with a rim, and an inflatable inner tube, of an outer case provided as to its edges with a series of parallel longitudinal interlocking ribs or corrugations, and an adhesive band or tape made in two sections the adjacent ends of which are applied to one edge of the outer case at each side of the valve-opening, the band-sections extending thence around the rim and overlapped at their meeting ends, whereby one edge of the outer case is bound around the rim, the said band being capable of yielding sufficiently to permit the free edge of the outer case to be removably inserted and be interlocked with said bound edge under the tape, substantially as described.

In testimony that I claim the foregoing as my own I have hereto affixed my signature in the presence of two witnesses.

WILLIAM I. DREISBACH.

Witnesses:
JOHN H. SIGGERS,
HAROLD H. SIMMS.